United States Patent
Chiu et al.

(10) Patent No.: US 12,420,619 B2
(45) Date of Patent: Sep. 23, 2025

(54) WATERPROOF STRUCTURE OF VEHICLE SUNROOF

(71) Applicants: FUZHOU MINGFANG AUTOMOBILE PARTS INDUSTRY CO., LTD., Fuzhou (CN); HSIN CHONG MACHINERY WORKS CO. LTD., Taoyuan (TW)

(72) Inventors: Tzu-Heng Chiu, Taoyuan (TW); Yi-Jen Lan, Taoyuan (TW); Karim Dayoub, Taoyuan (TW); Chris. Pelino, Taoyuan (TW)

(73) Assignees: FUZHOU MINGFANG AUTOMOBILE PARTS INDUSTRY CO., LTD., Fuzhou (CN); HSIN CHONG MACHINERY WORKS CO. LTD., Taoyuan (TW)

(*) Notice: Subject to any disclaimer, the term of this patent is extended or adjusted under 35 U.S.C. 154(b) by 388 days.

(21) Appl. No.: 18/202,287

(22) Filed: May 26, 2023

(65) Prior Publication Data

US 2024/0116342 A1    Apr. 11, 2024

Related U.S. Application Data

(60) Provisional application No. 63/415,065, filed on Oct. 11, 2022.

(51) Int. Cl.
| | |
|---|---|
| *B60J 7/00* | (2006.01) |
| *B60J 7/043* | (2006.01) |
| *B60J 10/02* | (2006.01) |
| *B60J 10/15* | (2016.01) |
| *B60J 10/24* | (2016.01) |
| *B60J 10/34* | (2016.01) |
| *B60J 10/70* | (2016.01) |

(Continued)

(52) U.S. Cl.
CPC ............ *B60J 10/24* (2016.02); *B60J 7/043* (2013.01); *B60J 10/15* (2016.02); *B60J 10/34* (2016.02); *B60J 10/70* (2016.02); *B60J 10/82* (2016.02); *B60J 10/90* (2016.02); *B60J 7/00* (2013.01)

(58) Field of Classification Search
CPC ..... B60J 7/00; B60J 7/043; B60J 10/24; B60J 10/70; B60J 10/82; B60J 10/777; B60J 10/763
USPC ............................ 296/216.2–6, 216.9, 220.1
See application file for complete search history.

(56) References Cited

U.S. PATENT DOCUMENTS

| | | | | |
|---|---|---|---|---|
| 6,332,645 | B1 * | 12/2001 | Schwarz | B60J 10/40 296/213 |
| 6,409,260 | B1 * | 6/2002 | Bohm | B60J 7/047 296/220.01 |
| D694,687 | S * | 12/2013 | Chauvin | D12/404 |

* cited by examiner

*Primary Examiner* — Dennis H Pedder
(74) *Attorney, Agent, or Firm* — HDLS IPR SERVICES; Chun-Ming Shih

(57) ABSTRACT

This disclosure is directed to a waterproof structure having a front window assembly, a rear window assembly and a pair of window side frame bars. The front window assembly has a front glass panel, a front frame, and a rear side portion. The rear window assembly has a rear glass panel, a rear sealing strip, a pair of side edges, and a front side portion connected between the pair of side edges. Each window side frame bar has a protrusion extended toward the rear side portion. The rear side portion has a pair of cover portions extended from two ends respectively, the front frame abuts against the rear sealing strip when the rear side portion moves to the front side portion, and the rear sealing strip and the protrusions are covered by the cover portions respectively.

9 Claims, 9 Drawing Sheets

(51) Int. Cl.
  *B60J 10/82* (2016.01)
  *B60J 10/90* (2016.01)

WATERPROOF STRUCTURE OF VEHICLE SUNROOF

CROSS-REFERENCE TO RELATED APPLICATION

This patent application claims the benefit of U.S. Provisional Patent Application No. 63/415,065, filed Oct. 11, 2022, which is incorporated by reference herein.

BACKGROUND OF THE DISCLOSURE

Technical Field

This disclosure is directed to a vehicle sunroof, and in particular to a waterproof structure of a vehicle sunroof.

Description of Related Art

A related-art vehicle sunroof is generally sealed with a sheet metal of a vehicle body by rubber strips. A vehicle sunroof with front-and-rear double glasses has a movable front window and a rear window fixed on a window opening. Therefore, a sealing structure between the front window and the vehicle body is different from a sealing structure between the rear window and the vehicle body. A seam is formed between each rubber strip and a mating component. When the front window in a close position, all of the seams are sealed by the elastic force caused by the rubber strips, but the elastic forces of the rubber strips are not effectively applied on the intersection at the junction of the seams of the front windows and the rear windows, and this leads to leakage.

In view of the above drawbacks, the inventor proposes this disclosure based on his expert knowledge and elaborate researches in order to solve the problems of related art.

SUMMARY OF THE DISCLOSURE

This disclosure is directed to a waterproof structure of a vehicle sunroof having a front window assembly, a rear window assembly and a pair of window side frame bars. The front window assembly has a front glass panel and a front frame, the front frame is arranged on a periphery of the front glass panel, and the front window assembly has a rear side portion. The rear window assembly has a rear glass panel and a rear sealing strip, the rear window assembly has a pair of side edges and a front side portion connected between the pair of side edges, the rear sealing strip is disposed to surround the pair of side edges and the front side portion. The pair of window side frame bars are disposed adjacent to the side edges of the rear window assembly respectively, and each window side frame bar has a protrusion extended toward the rear side portion. The rear side portion has a pair of cover portions extended from two ends respectively, the pair of cover portions are disposed respectively corresponding to two ends of the front side portion of the rear window assembly, the front frame abuts against the rear sealing strip when the rear side portion moves to be close to the front side portion, and the rear sealing strip and the protrusions are covered by the cover portions respectively.

According to an embodiment of this disclosure, the rear window assembly has a rear frame, the rear frame is disposed to surround a periphery of the rear glass panel, the rear sealing strip is assembled on the rear frame. The rear sealing strip is clamped between the front frame and the rear frame.

According to an embodiment of this disclosure, the cover portions cover the junction between each side edge of the rear window assembly and the rear side portion of the front window assembly.

According to an embodiment of this disclosure, the rear sealing strip is of a hollow tubular shape.

According to an embodiment of this disclosure, the front window assembly has a front sealing strip, the front frame is surrounded by the front sealing strip, and the rear side portion of the front window assembly is exposed.

According to an embodiment of this disclosure, the front sealing strip is assembled on the front frame. The front sealing strip is of a hollow tubular shape.

According to an embodiment of this disclosure, the pair of cover portions are disposed at the two ends of the rear side portion of the front window assembly.

According to the waterproof structure of vehicle sunroof of this disclosure, when the front window assembly and the rear window assembly move to be closed with each other, the cover portions are capable of covering the junctions of the seam between the rear side portion of the front window assembly and the side edges of the rear window assembly, thereby avoiding leakage.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
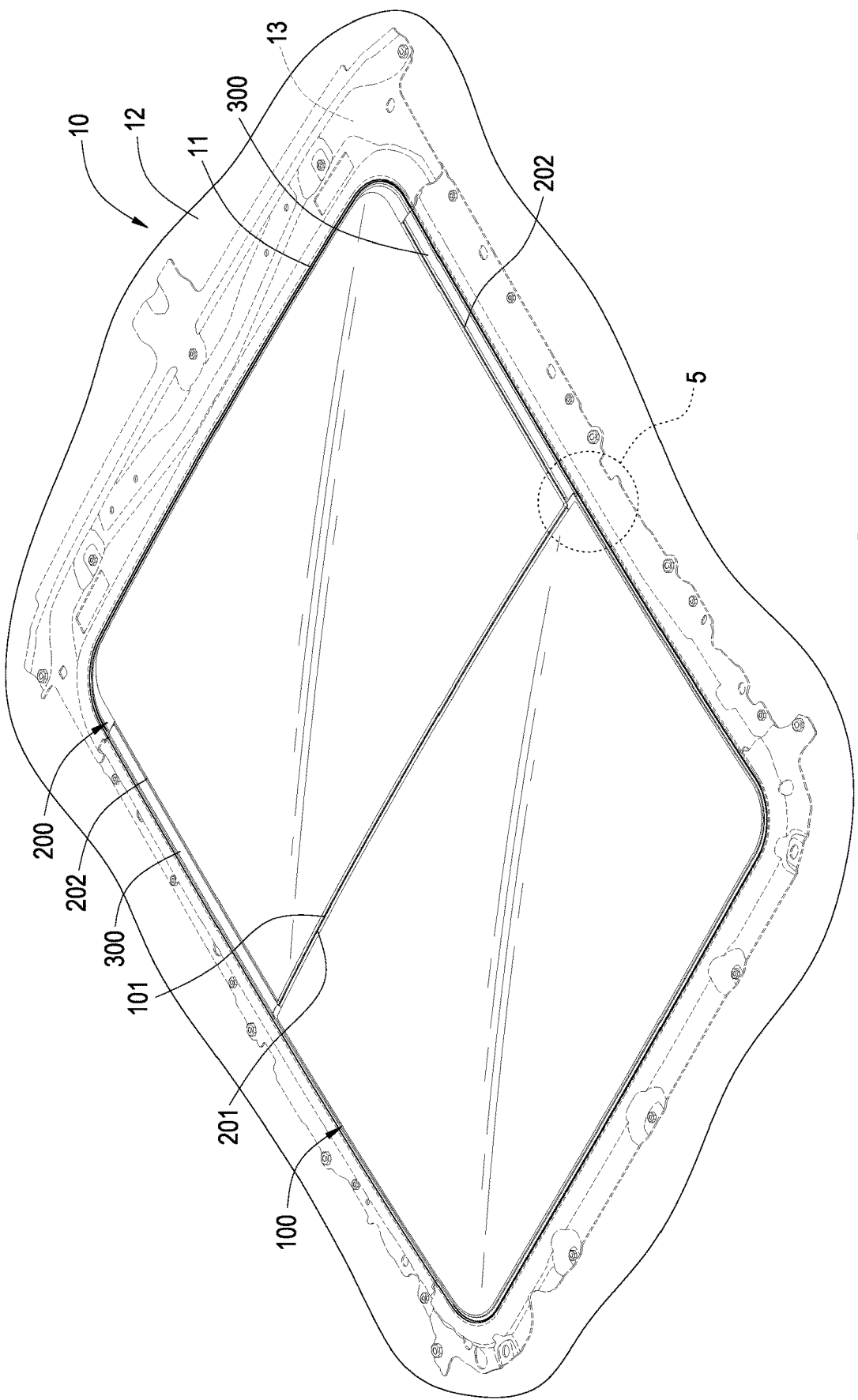
FIGS. 1 and 2 are perspective views showing a waterproof structure of a vehicle sunroof in a closed status according to this disclosure.

The technical contents of this disclosure will become apparent with the detailed description of embodiments accompanied with the illustration of related drawings as follows. It is intended that the embodiments and drawings disclosed herein are to be considered illustrative rather than restrictive.

According to FIGS. 1 to 6, an embodiment of this disclosure is directed to a waterproof structure of a vehicle sunroof, the waterproof structure has a front window assembly 100, a rear window assembly 200 and a pair of window side frame bars 300. The waterproof structure of the vehicle sunroof according to this disclosure is arranged in a window opening 11 on a vehicle roof 10. The window opening 11 is approximately of a rectangular shape, the front window assembly 100 is movably arranged on the window opening 11, the rear window assembly 200 is fixed in the window opening 11, a half portion of the window opening 11 is covered by the rear window assembly 200. The front window assembly 100 is capable of moving to the rear window assembly 200 to cover another half portion of the window opening 11, thereby closing the window opening 11. Specifically, both of the front window assembly 100 and the rear window assembly 200 are approximately of a rectangular shape. Relative to a moving path of the front window assembly 100, the front window assembly 100 has a rear side portion 101, the rear window assembly 200 has a front side portion 201. The rear side portion 101 of the front window assembly 100 and the front side portion 201 of the rear window assembly 200 are matched with each other in profile, and therefore the two are capable of being closed with each other. The rest parts of the front window assembly 100 and the rear window assembly 200 are matched with an inner edge of the window opening 11 in profile. Specifically, the vehicle roof 10 generally has a sheet metal roof 12 and a reinforcing frame 13, the window opening 11 is defined on the sheet metal roof 12, the reinforcing frame 13 is disposed on the sheet metal roof 12 corresponding to the window opening 11 for installing the front window assembly 100 and the rear window assembly 200, and the reinforcing frame 13 may be directly welded with the sheet metal roof 12.

According to FIGS. 1 and 7 to 9, the front window assembly 100 is capable of moving upward from the rear window assembly 200 so as to open the window opening 11.

According to FIGS. 1 to 3 and 7, the front window assembly 100 has a front glass panel 110 and a front frame 120, and the front window assembly 100 further has a front sealing strip 130 according to this embodiment. The front glass panel 110 is approximately of a rectangular shape, the front frame 120 is a rectangular frame made of hard plastic (e.g., Polyurethane/PU, but the scopes of this disclosure should not be limited to the embodiment), the front frame 120 is disposed to surround a periphery of the front glass panel 110, the front sealing strip 130 is a hollow tube made of elastic resin (e.g., silicon or rubber, but the scopes of this disclosure should not be limited to the embodiment), and the front sealing strip 130 is assembled on a periphery of the front frame 120. According to FIGS. 3 and 4, specifically, the front frame 120 is surrounded by the front sealing strip 130, and the front sealing strip 130 is not extended to the rear side portion 101 of the front window assembly 100, so that the front frame 120 is exposed at the rear side portion 101 of the front window assembly 100. According to FIGS. 1, 5 and 6, when the front window assembly 100 moves to be close to the rear window assembly 200, the rear side portion 101 of the front window assembly 100 abuts against the front side portion 201 of the rear window assembly 200.

Figure 7:
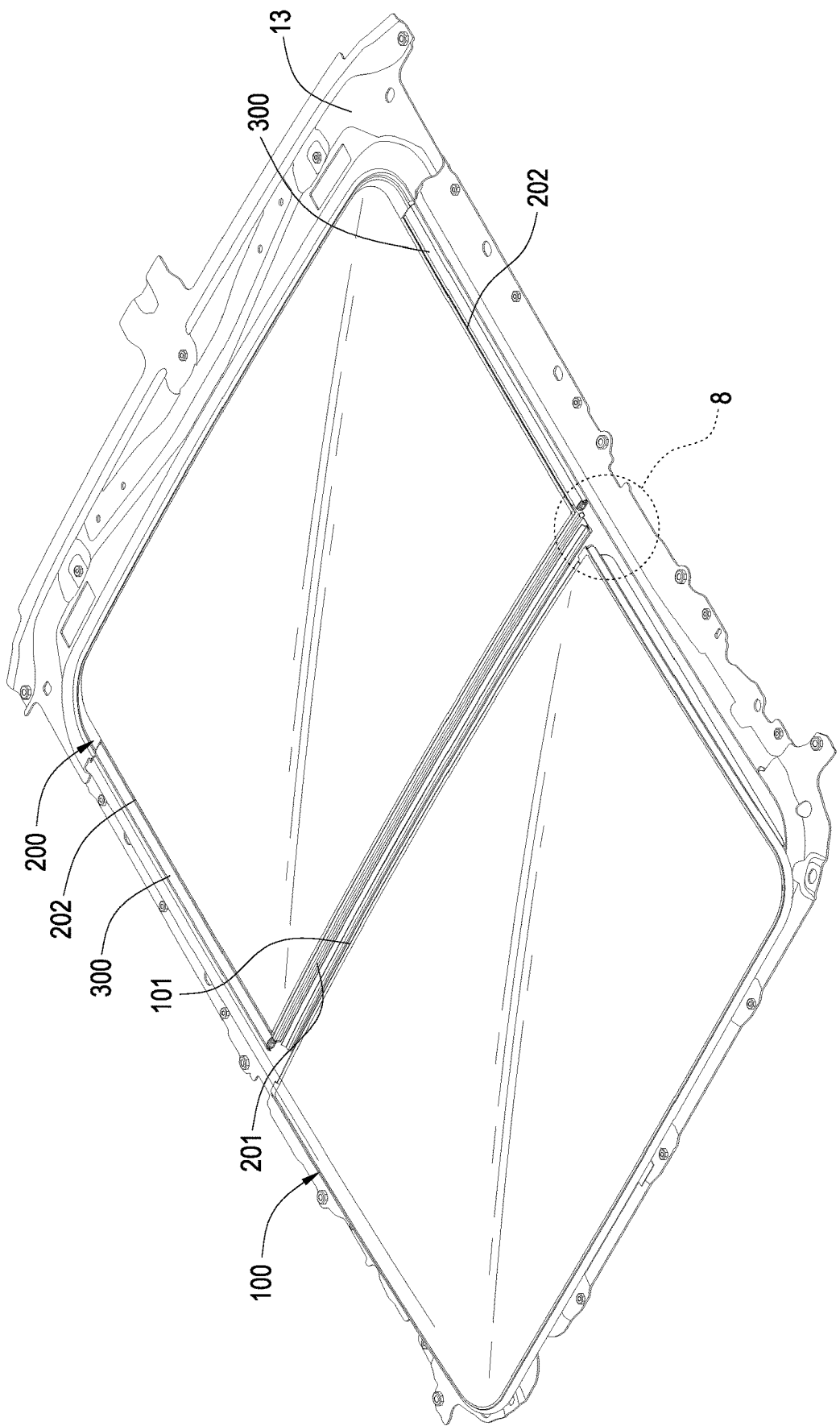
FIG. 7 is a perspective view showing the waterproof structure of the vehicle sunroof in an opened status according to this disclosure.
Figure 8:
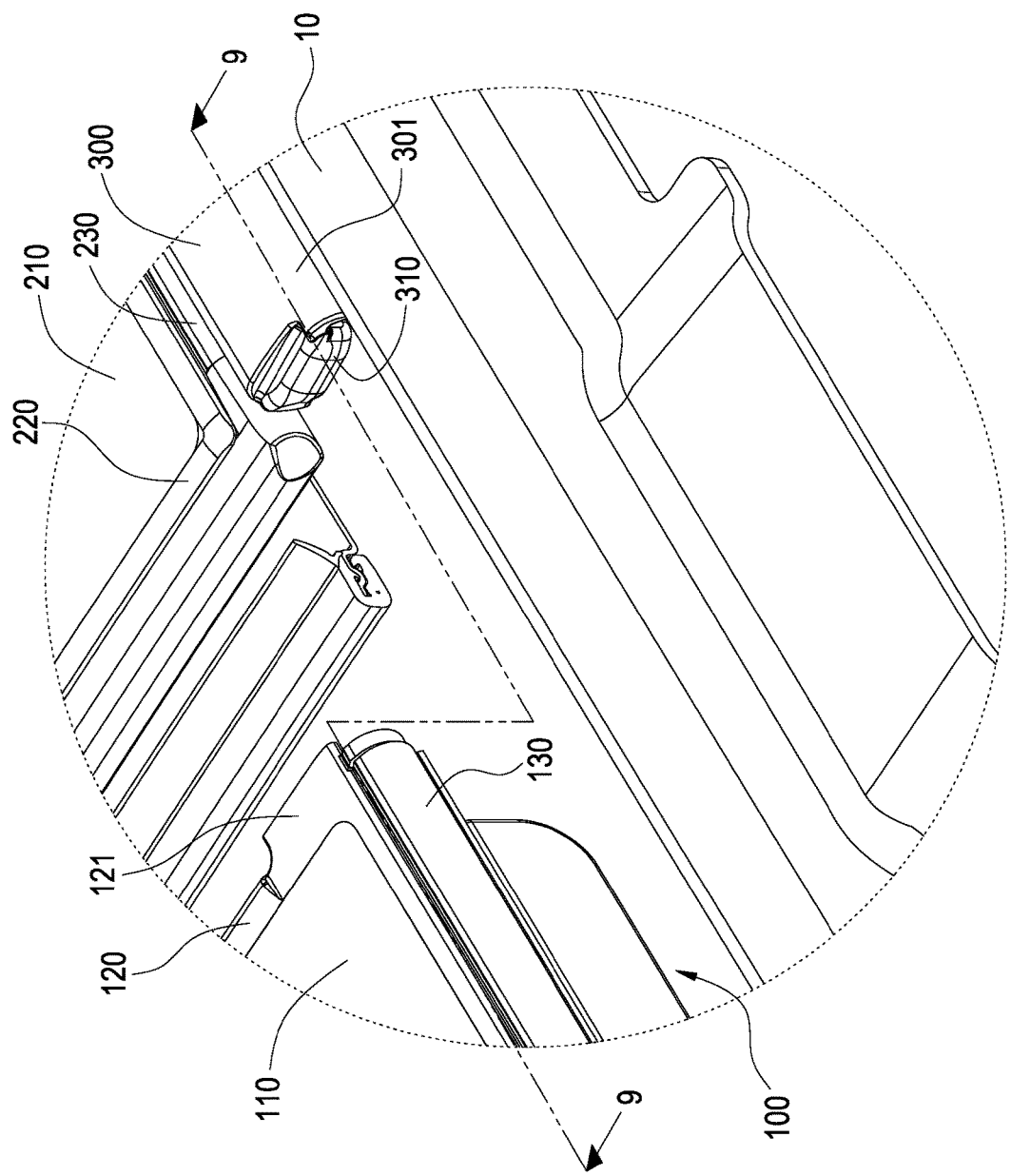
FIG. 8 is an enlarged view of an area 8 shown in FIG. 7.
Figure 9:
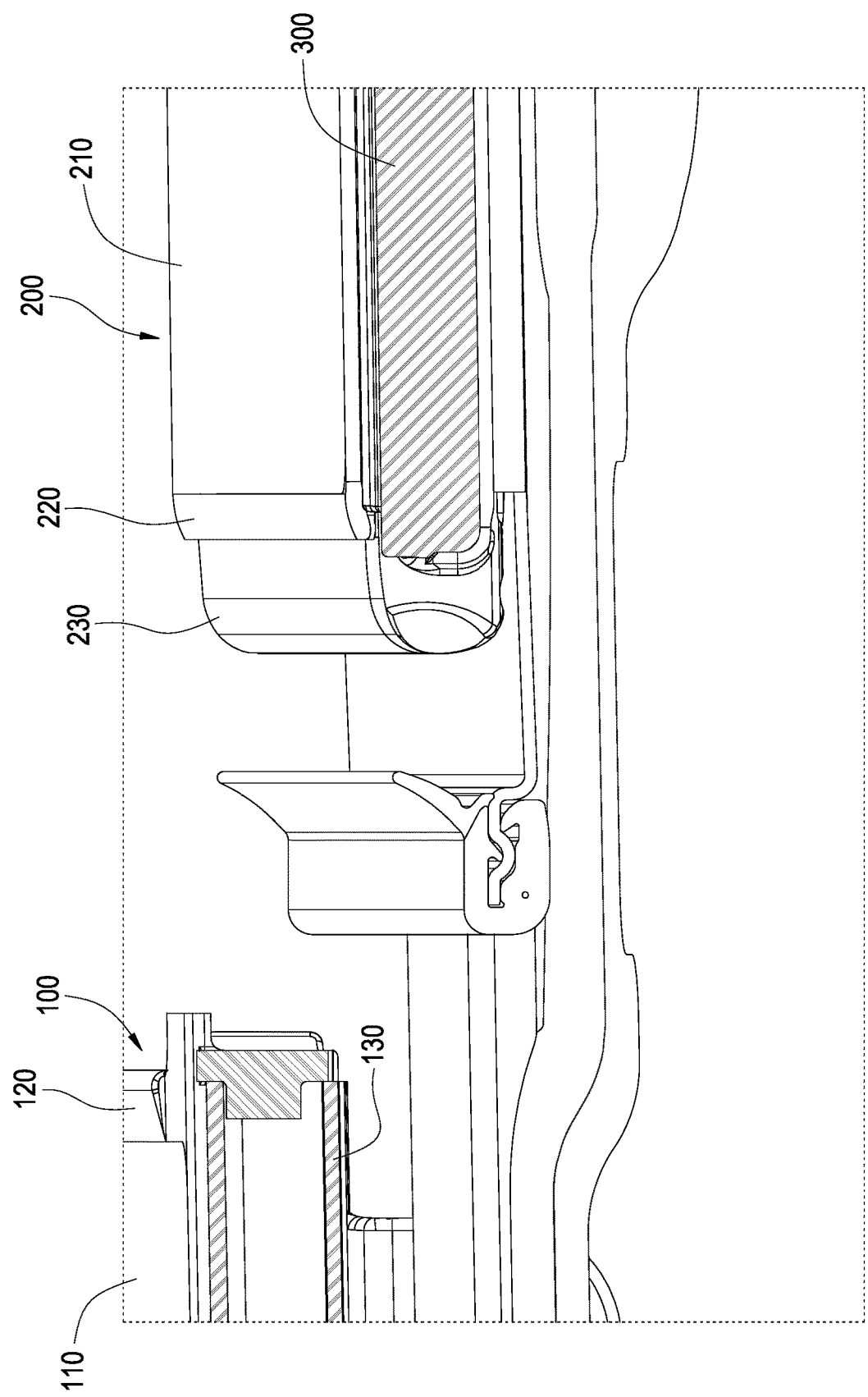
FIG. 9 is a cross-sectional view along a cross line 9-9 shown in FIG. 8.

According to FIGS. 7 to 9, the rear window assembly 200 has a rear glass panel 210 and a rear sealing strip 230, and the rear window assembly 200 further has a rear frame 220 according to this embodiment. The rear frame 220 is made of hard plastic (e.g., Polyurethane/PU, but the scopes of this disclosure should not be limited to the embodiment). The rear window assembly 200 has a pair of side edges 202, and the front side portion 201 of the rear window assembly 200 is connected between the pair of side edges 202. The rear frame 220 is disposed to surround a periphery of the rear glass panel 210, the rear sealing strip 230 is a hollow tube made of elastic resin (e.g., silicon or rubber, but the scopes of this disclosure should not be limited to the embodiment), and the rear sealing strip 230 is assembled on a periphery of the rear frame 220. The rear sealing strip 230 at least surrounds the side edges 202 and the front side portion 201 of the rear window assembly 200. According to FIGS. 1, 5 and 6, when the front side portion 201 of the rear window assembly 200 moves to be close to the rear side portion 101 of the front window assembly 100 and the front frame 120 abuts against the rear sealing strip 230, the rear sealing strip 230 is clamped and compressed by the front frame 120 and rear frame 220 so as to have sealing function.

Figure 2:
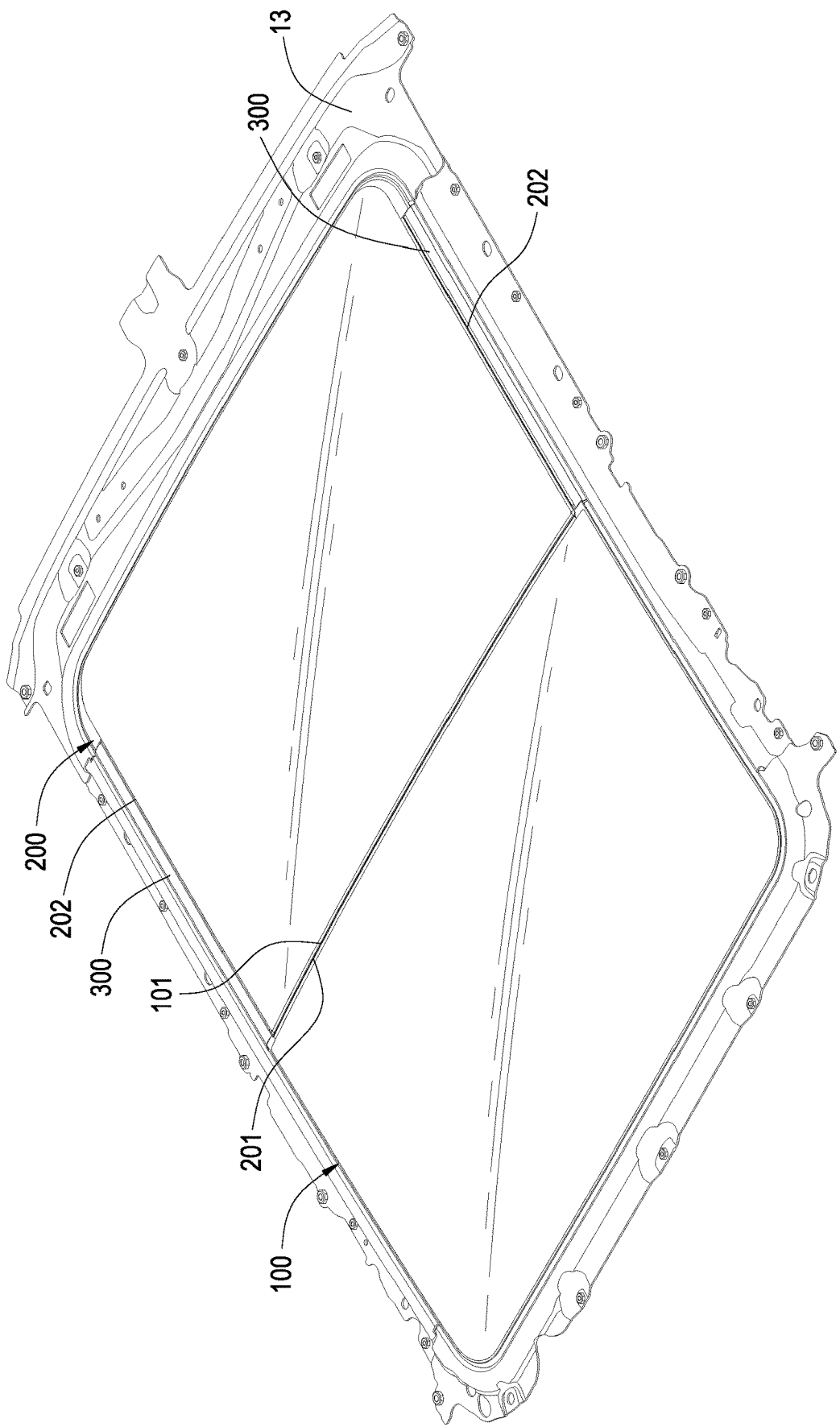

According to FIGS. 1 to 2 and 7, the window side frame bars 300 are made of hard plastic (e.g., Polyurethane/PU, but the scopes of this disclosure should not be limited to the embodiment), the pair of window side frame bars 300 are disposed opposite to each other on the inner edge of the window opening 11 corresponding to the side edges 202 of the rear window assembly 200 respectively. The pair of window side frame bars 300 are attached on the side edges 202 of the rear window assembly 200 respectively. According to FIGS. 5 and 8, each window side frame bar 300 has a terminal end 301 disposed toward the front window assembly 100, each window side frame bar 300 has a protrusion 310, and each protrusion 310 is extended toward the rear side portion 101 of the front window assembly 100 from the terminal end 301 of the window side frame bar 300 where the protrusion 310 is located. Moreover, according to FIGS. 1 to 2 and 5, when the front window assembly 100 moves to be close to the rear window assembly 200 as shown in figures, the terminal ends 301 of the window side frame bars 300 abut against the front frame 120 by the protrusions 310 respectively.

Figure 3:
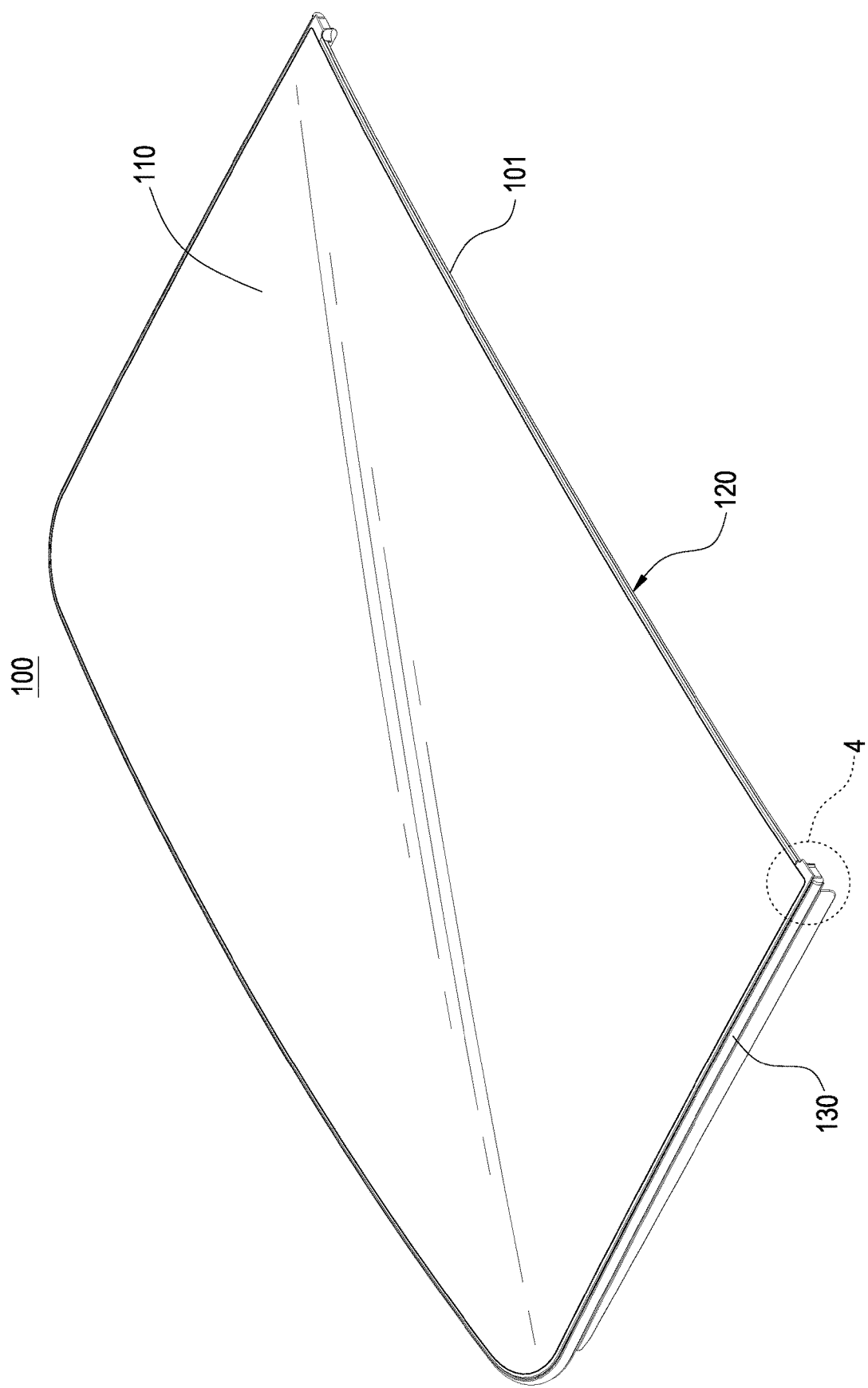
FIG. 3 is a perspective view showing a front window assembly of the waterproof structure of the vehicle sunroof according to this disclosure.
Figure 4:
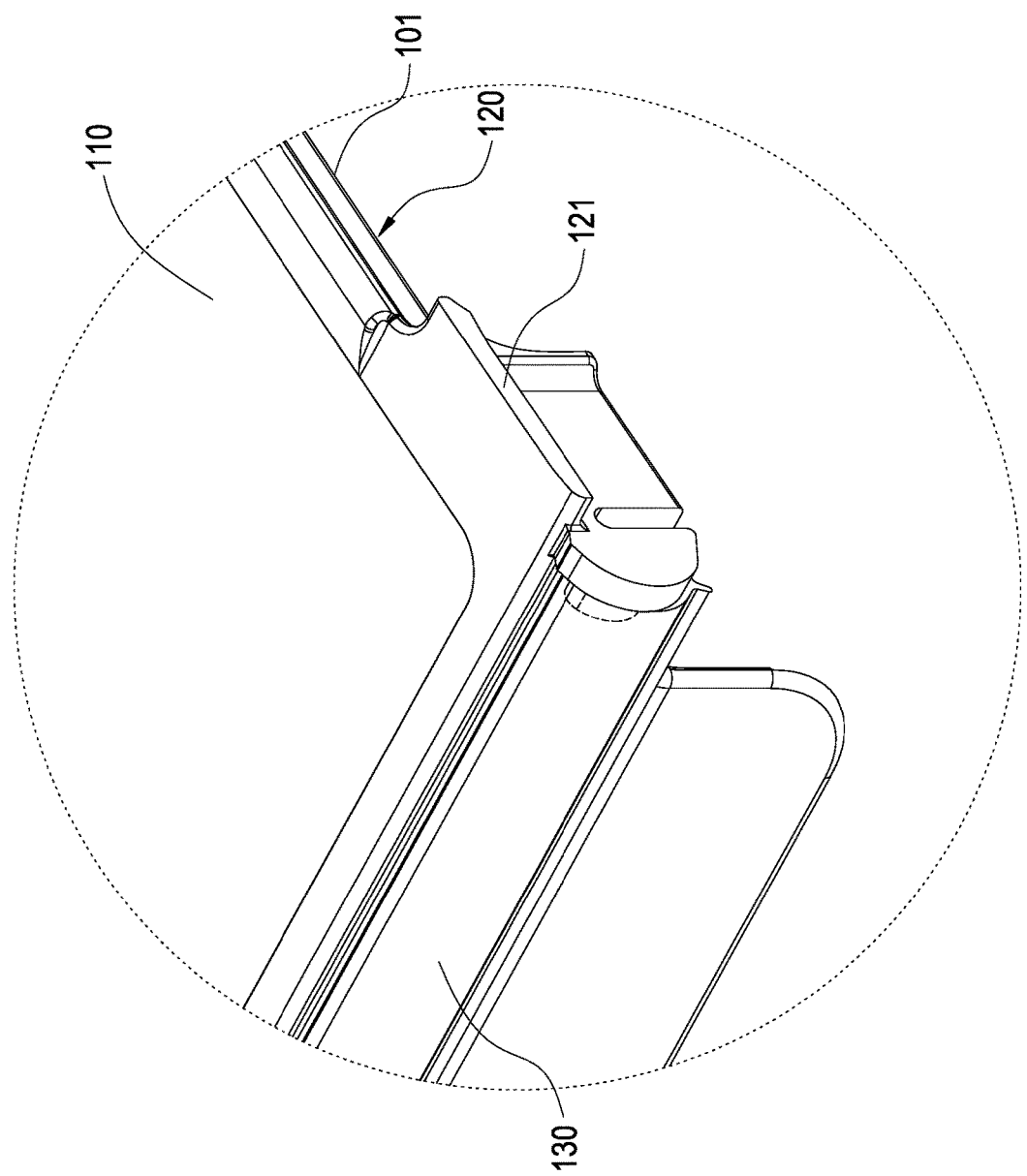
FIG. 4 is an enlarged view of an area 4 shown in FIG. 3.
Figure 5:
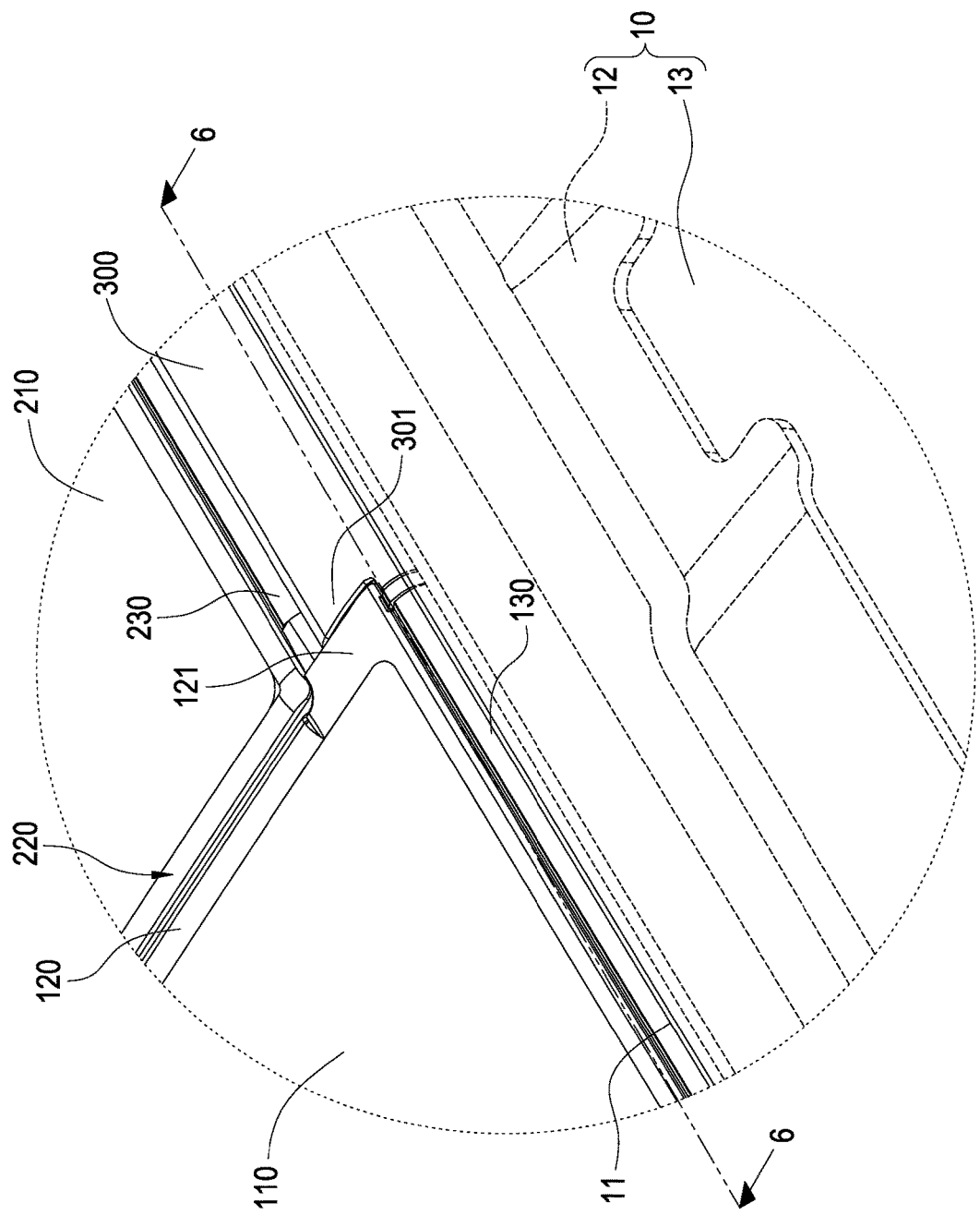
FIG. 5 is an enlarged view of an area 5 shown in FIG. 1.
Figure 6:
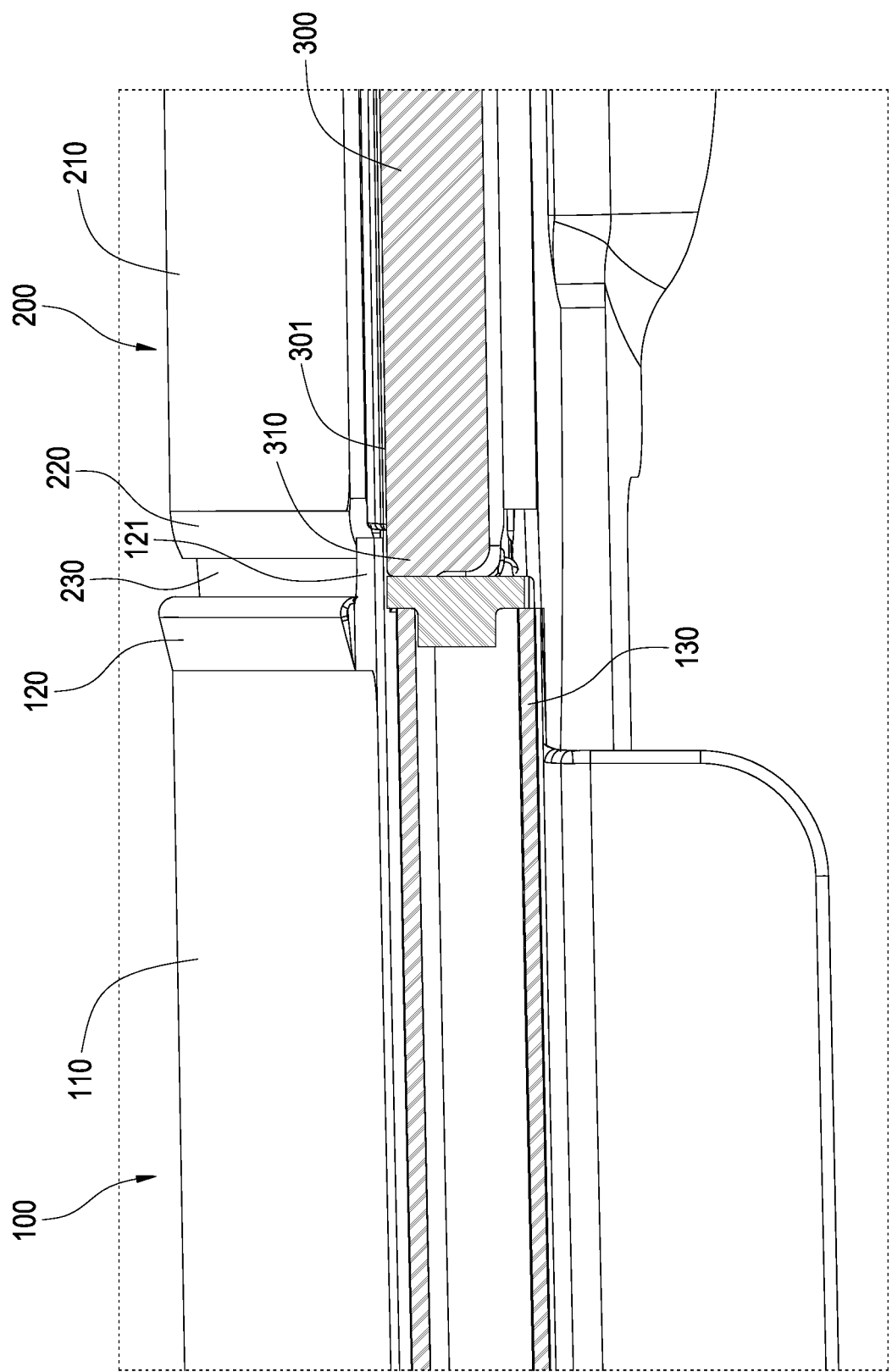
FIG. 6 is a cross-sectional view along a cross line 6-6 shown in FIG. 5.

According to FIGS. 3 and 4, a pair of cover portions 121 are extended from the front frame 120, the pair of cover portions 121 are disposed on two ends of the rear side portion 101 of the front window assembly 100 corresponding to two ends of the front side portion 201 of the rear window assembly 200 respectively. According to FIGS. 1 to 2 and 5 to 6, when the front window assembly 100 is closed with the rear window assembly 200, the pair of cover portions 121 respectively cover the front frame 120, the rear sealing strip 230 and the protrusions 310 of the window side frame bars 300 corresponding thereto. When the front window assembly 100 is closed with the rear window assembly 200, a seam is formed between the rear sealing strip 230 and cooperated structures (front window assembly 100, window side frame bar 300) respectively. The cover portions 121 is capable of respectively covering junctions of the seam between the rear side portion 101 of the front window assembly 100 and the side edges 202 of the rear window assembly 200, thereby avoiding leakage.

While this disclosure has been described by means of specific embodiments, numerous modifications and variations could be made thereto by those skilled in the art without departing from the scope and spirit of this disclosure set forth in the claims.

What is claimed is:
1. A waterproof structure of a vehicle sunroof, the waterproof structure comprising:
 a front window assembly, comprising a front glass panel, a front frame, the front frame arranged on a periphery of the front glass panel and comprising a rear side portion;
 a rear window assembly, comprising a rear glass panel, a rear sealing strip, a pair of side edges, and a front side portion connected between the pair of side edges, and the rear sealing strip disposed to surround the pair of side edges and the front side portion; and
 a pair of window side frame bars, disposed adjacent to the side edges of the rear window assembly respectively, and each window side frame bar comprising a protrusion extended toward the rear side portion, wherein the rear side portion comprises a pair of cover portions extended from two ends thereof respectively, the pair of cover portions are disposed corresponding to two ends of the front side portion of the rear window assembly respectively, the front frame abuts against the rear sealing strip when the rear side portion moves to be close to the front side portion, and the rear sealing strip and the protrusions are covered by the cover portion respectively.

2. The waterproof structure according to claim 1, wherein the rear window assembly comprises a rear frame, the rear frame is adapted to sheathe a periphery of the rear glass panel, and the rear sealing strip is assembled on the rear frame.

3. The waterproof structure according to claim 2, wherein the rear sealing strip is clamped between the front frame and the rear frame.

4. The waterproof structure according to claim 1, wherein the cover portions cover junction between each side edge of the rear window assembly and the rear side portion of the front window assembly.

5. The waterproof structure according to claim 1, wherein the rear sealing strip is of a hollow tubular shape.

6. The waterproof structure according to claim 1, wherein the front window assembly comprises a front sealing strip, the front frame is surrounded by the front sealing strip, and the rear side portion of the front window assembly is exposed.

7. The waterproof structure according to claim 1, wherein the front sealing strip is assembled on the front frame.

8. The waterproof structure according to claim 7, wherein the front sealing strip is of a hollow tubular shape.

9. The waterproof structure according to claim 1, wherein the pair of cover portions are disposed at the two ends of the rear side portion of the front window assembly respectively.

* * * * *